United States Patent
Park et al.

(10) Patent No.: US 8,055,192 B2
(45) Date of Patent: Nov. 8, 2011

(54) METHOD OF FEEDING BACK CHANNEL INFORMATION AND RECEIVER FOR FEEDING BACK CHANNEL INFORMATION

(75) Inventors: Chang Soon Park, Chungju-si (KR); Jun Mo Kim, Seoul (KR); Sung Jin Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 744 days.

(21) Appl. No.: 12/135,600

(22) Filed: Jun. 9, 2008

(65) Prior Publication Data

US 2009/0004986 A1    Jan. 1, 2009

Related U.S. Application Data

(60) Provisional application No. 60/945,996, filed on Jun. 25, 2007.

(30) Foreign Application Priority Data

Dec. 18, 2007  (KR) .................. 10-2007-0133726

(51) Int. Cl.
*H04B 17/00* (2006.01)
*H04B 1/00* (2006.01)

(52) U.S. Cl. ...... 455/39; 455/67.11; 455/69; 455/226.1; 370/335; 370/342; 375/240.03; 375/316

(58) Field of Classification Search ............... 455/67.11, 455/67.13, 69, 70, 226.1–226.4, 562.1; 375/240.03, 375/240.05, 267, 316, 346–347, 349; 370/335, 370/342
See application file for complete search history.

(56) References Cited

U.S. PATENT DOCUMENTS

| | | | | |
|---|---|---|---|---|
| 7,065,338 B2 * | 6/2006 | Mano et al. | .................. | 455/313 |
| 7,656,842 B2 * | 2/2010 | Thomas et al. | ............... | 370/334 |
| 7,689,177 B2 * | 3/2010 | Kim et al. | ..................... | 455/101 |
| 7,720,181 B2 * | 5/2010 | Park et al. | ..................... | 375/341 |
| 7,769,098 B2 * | 8/2010 | Borkar et al. | ................ | 375/267 |
| 7,782,573 B2 * | 8/2010 | Zhou et al. | ..................... | 360/260 |
| 7,895,044 B2 * | 2/2011 | Lin et al. | ...................... | 704/500 |
| 2005/0287978 A1 | 12/2005 | Maltsev et al. | | |

(Continued)

FOREIGN PATENT DOCUMENTS

JP  2007-020188  1/2007

(Continued)

*Primary Examiner* — Simon Nguyen
(74) *Attorney, Agent, or Firm* — NSIP Law

(57) ABSTRACT

Provided is a receiver for feeding back channel information, which includes a channel vector measuring unit to measure channel vectors corresponding to a plurality of receiving antennas, respectively, that receive a plurality of data streams, a candidate codebook vector selecting unit to select at least two candidate codebook vectors from codebook vectors included in a codebook, by considering a quantization error based on the channel vectors with respect to each of the data streams, and a selection codebook vector determining unit to determine selection codebook vectors corresponding to the plurality of data streams respectively from the at least two candidate codebook vectors, based on a signal-to-interference and noise ratio (SINR) of each of the data streams that is calculated according to each of the candidate codebook vectors.

19 Claims, 6 Drawing Sheets

U.S. PATENT DOCUMENTS

2006/0056533 A1  3/2006  Molisch et al.
2006/0068718 A1  3/2006  Li et al.
2008/0080449 A1* 4/2008  Huang et al. .................. 370/342
2008/0165875 A1* 7/2008  Mundarath et al. ........... 375/262
2008/0227495 A1* 9/2008  Kotecha et al. ............ 455/562.1
2009/0074096 A1* 3/2009  Hansen et al. ................ 375/260

FOREIGN PATENT DOCUMENTS

KR  10-2006-0043799  5/2006
KR  10-2006-0119144  11/2006
KR  10-2007-0085128  8/2007

* cited by examiner

METHOD OF FEEDING BACK CHANNEL INFORMATION AND RECEIVER FOR FEEDING BACK CHANNEL INFORMATION

CROSS-REFERENCE TO RELATED APPLICATIONS

This application claims the benefit of a U.S. Provisional Application No. 60/945,996, filed on Jun. 25, 2007 in the U.S. Patent and Trade Mark Office, and of Korean Patent Application No. 2007-133726, filed on Dec. 18, 2007 in the Korean Intellectual Property Office, the disclosures of which are incorporated herein by reference.

TECHNICAL FIELD

The following description relates to a technology that enables a receiver such as a user terminal to feed back channel information, and more particularly, to a technology that enables a receiver such as a user terminal to effectively feed back channel information in a Multiple-Input Multiple-Output (MIMO) communication system where the capacity used for feeding back the channel information is limited.

BACKGROUND

In general, the theoretical capacity of a Multiple-Input Multiple-Output (MIMO) communication system with M transmitting antennas and N receiving antennas is greater than the theoretical capacity of a system with a single transmitting/receiving antenna by approximately min(M, N) folds.

However, when multiple antennas are installed in a receiver such as a user terminal, various issues may arise, such as high cost and an inability to secure sufficient distance between the antennas. Generally, there is a limit to the number of receiving antennas that can be installed in the receiver such as the user terminal. However, limiting the number of receiving antennas can limit the theoretical capacity.

Currently, various types of technologies have been proposed to overcome the above problems. A representative technology is a multi-user MIMO system technology. According to the multi-user MIMO system technology, the capacity may be increased as the number of multiple transmitting antennas installed in a base station increases.

In order to increase the capacity as the number of multiple transmitting antennas increases, the base station should be aware of the channel state of user terminals and generate a transmission signal based on the channel state. In order for the base station to sufficiently detect the channel state, complex hardware may be required and wireless resources may need to be consumed. Among the transmission schemes, a zero-forcing beamforming (ZFBF) scheme may achieve high performance with relatively less hardware complexity.

When applying the ZFBF scheme, the user terminal should feed back to the base station channel information that includes channel direction information (CDI) and channel quality information (CQI). For this feedback operation, there are various problems to be solved.

As an example, in a multi-user MIMO system adopting the ZFBF scheme, user terminals may not feed back to the base station the accurate CDI that matches a direction of an actual channel. Generally, each user terminal selects a vector from pre-stored codebook vectors that most matches the direction of the actual channel, and feeds back direction information of the selected vector as the CDI. Therefore, a difference between the direction of the actual channel and the CDI fed back from the user terminal may exist. The difference may be referred to as a quantization error.

As another example, when the user terminals receive data, the base station and the user terminals may not accurately estimate a signal-to-interference and noise ratio (SINR) in each of the user terminals. Since the base station may not accurately estimate the SINR, it may be impossible to set a data transmission rate appropriate for the actual channel.

Accordingly, there is a need for a technology that generates CDI and CQI as close to the accurate values as possible and feed back the generated CDI and the CQI to a base station so that a user terminal may maximize the capacity of a MIMO system.

SUMMARY

According to an aspect, there is provided a receiver for feeding back channel information comprising a channel vector measuring unit to measure channel vectors corresponding to a plurality of receiving antennas, respectively, that receive a plurality of data streams, a candidate codebook vector selecting unit to select at least two candidate codebook vectors for each data stream from codebook vectors included in a codebook, by considering a quantization error based on the channel vectors with respect to each of the data streams, and a selection codebook vector determining unit to determine selection codebook vectors corresponding to the plurality of data streams respectively from the at least two candidate codebook vectors, based on a signal-to-interference and noise ratio (SINR) of each data stream that is calculated according to each of the candidate codebook vectors.

The plurality of data streams may comprise a first data stream, wherein the candidate codebook vector selecting unit may select at least two first candidate codebook vectors associated with the first data stream from the codebook vectors, based on the quantization error corresponding to an angle between the codebook vectors and a space spanned by the channel vectors, and the selection codebook vector determining unit may determine a first selection codebook vector corresponding to the first data stream from the first candidate codebook vectors, based on the SINR of the first data stream that is calculated according to the at least two first candidate codebook vectors.

The plurality of data streams may further comprise a second data stream, wherein the candidate codebook vector selecting unit may select at least two second candidate codebook vectors associated with the second data stream from the codebook vectors, based on an orthogonality between the first selection codebook vectors and the codebook vectors, and the selection codebook vector determining unit may determine a second selection codebook vector corresponding to the second data stream from the second candidate codebook vectors, based on a sum of data transmission rates that is a function of the SINR of the first data stream and the SINR of the second data stream that is calculated based on the at least two second candidate codebook vectors.

The plurality of data streams may further comprise a third data stream, wherein the candidate codebook vector selecting unit may select at least two third candidate codebook vectors associated with the third data stream from the codebook vectors, based on an angle between the codebook vectors and a space spanned by the first selection codebook vector and the second selection codebook vector, and the selection codebook vector determining unit may determine a third selection codebook vector corresponding to the third data stream from the third candidate codebook vectors, based on a sum of data transmission rates that is a function of the SINR of the first data stream, the SINR of the second data stream, and the SINR of the third data stream that is calculated based on the at least two third candidate codebook vectors.

The selection codebook vector determining unit may determine the selection codebook vectors corresponding to the plurality of data streams respectively from the candidate codebook vectors to maximize a sum of data transmission rates that is a function of the SINR of each of the data streams.

The candidate codebook vector selecting unit may select the candidate codebook vectors from the codebook vectors in an order from a smallest quantization error.

The candidate codebook vector selecting unit may estimate the quantization error based on an angle between the codebook vectors and a space spanned by the channel vectors, and select the candidate codebook vectors based on the estimated quantization error.

The receiver may further comprise a receive beamforming unit to perform receive beamforming using the determined selection codebook vector.

The receiver may further comprise a channel information feedback unit to feed back to a base station channel direction information and channel quality information corresponding to the selection codebook vector.

According to another aspect, there is provided a receiver for feeding back channel information, comprising a channel vector measuring unit to measure channel vectors corresponding to a plurality of receiving antennas, respectively, that receive a data stream, a candidate codebook vector selecting unit to select at least two candidate codebook vectors from codebook vectors included in a codebook, by considering a quantization error based on the channel vectors, a selection codebook vector determining unit to determine a selection codebook vector corresponding to the data stream from the candidate codebook vectors, based on a signal-to-interference and noise ratio (SINR) that is calculated according to each of the candidate codebook vectors, and a receive beamforming unit to perform receive beamforming using the determined selection codebook vector.

The receiver may further comprise a channel information feedback unit to feed back to a base station channel direction information and channel quality information corresponding to the selection codebook vector.

The receive beamforming unit may perform receive beamforming using receive weight vectors that are calculated based on the selection codebook vector.

According to still another aspect, there is provided a method of feeding back channel information, comprising measuring channel vectors corresponding to a plurality of receiving antennas, respectively, that receive a plurality of data streams, selecting at least two candidate codebook vectors from codebook vectors included in a codebook, by considering a quantization error based on the channel vectors with respect to each of the data streams, and determining selection codebook vectors corresponding to the plurality of data streams respectively from the candidate codebook vectors, based on an SINR of each of the data streams that is calculated according to each of the candidate codebook vectors.

According to yet another aspect, there is provided a method of generating quality information of a terminal receiving a plurality of data streams, comprising calculating effective channel vectors corresponding to the plurality of data streams respectively, calculating a signal-to-interference and an SINR of each of the effective channel vectors based on an interference power caused by at least one adjacent terminal of the terminal and another interference power caused by remaining data streams after excluding a target data stream from the plurality of data streams, and feeding back to a base station channel quality information associated with each of the effective channel vectors, wherein the channel quality information includes the corresponding SINR that is quantized.

The calculating of the SINR may comprises estimating transmit weight vectors corresponding to the plurality of data streams respectively, based on the effective channel vectors, estimating the interference power caused by the at least one adjacent terminal of the terminal, based on the effective channel vectors and the estimated transmit weight vectors, and estimating the interference power caused by the remaining data streams, based on the effective channel vectors.

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawings and the detailed description, the same drawing reference numerals will be understood to refer to the same elements, features, and structures.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions are omitted to increase clarity and conciseness.

Figure 1:
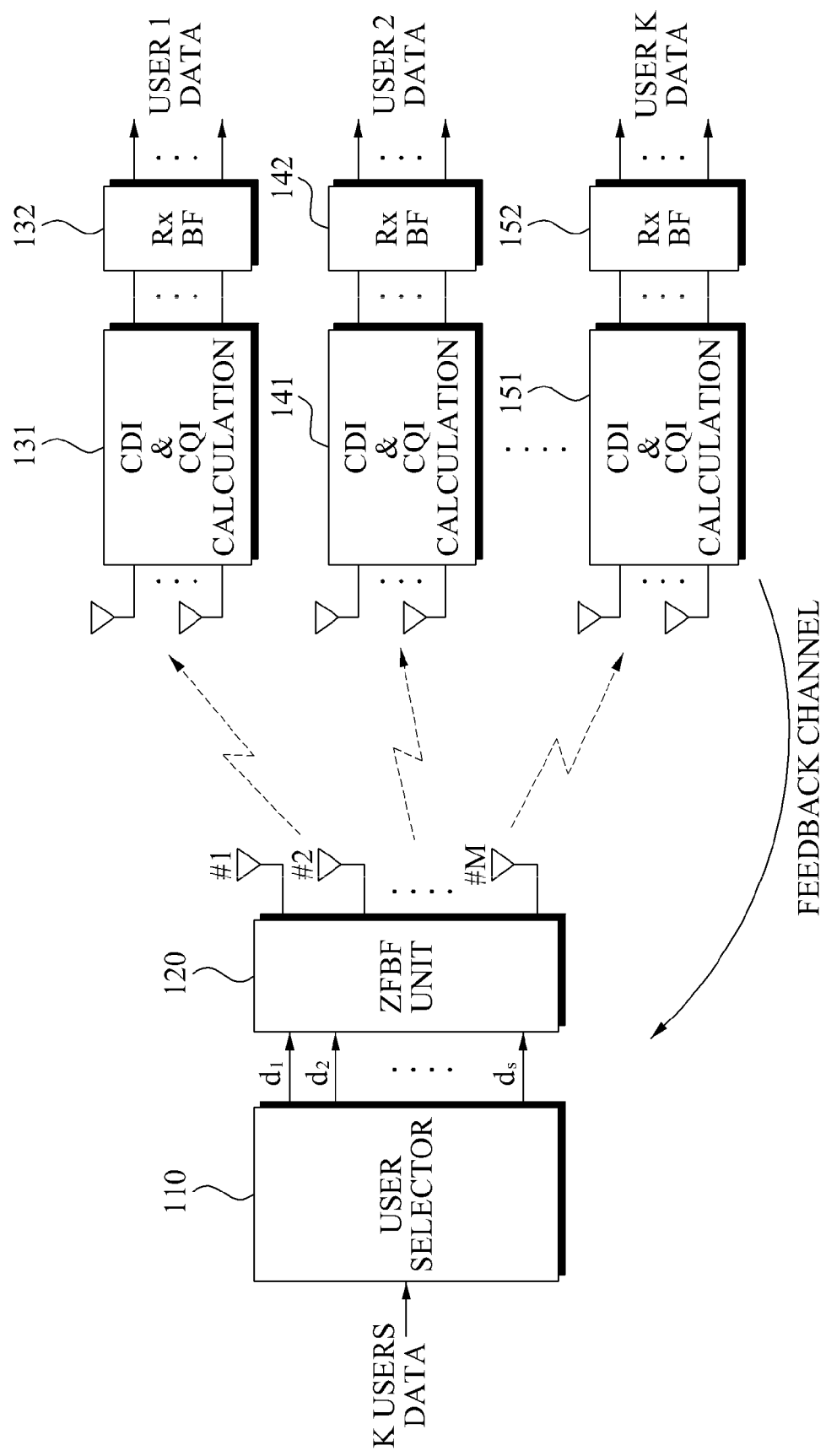
FIG. 1 illustrates a multi-user Multiple-Input Multiple-Output (MIMO) communication system according to an exemplary embodiment.

FIG. 1 illustrates a multi-user Multiple-Input Multiple-Output (MIMO) communication system according to an exemplary embodiment.

Referring to FIG. 1, in the multi-user MIMO communication system, a base station includes a user selector 110 and a zero-forcing beamforming (ZFBF) unit 120. Each user terminal includes a channel information generator 131, 141, and 151, and a receive beamforming (Rx BF) unit 132, 142, and 152, respectively.

Each of K user terminals may measure its channel state and calculate channel direction information (CDI) and channel quality information (CQI) based on the measured channel state. Depending on a number of data streams corresponding to the user terminals respectively, a single or a plurality of CDI and CQI may exist.

Where each of the user terminals generates CDI and CQI, each of the user terminals may extract a receive weight vector to be used for receive beamforming based on the extracted CDI and the CQI. Each of the user terminals may combine received signals using the receive weight vector.

Each of the user terminals feeds back the generated CDI and CQI to the base station via a feedback channel. In the case of a system that is able to adjust the number of data streams, each of the user terminals may inform the base station about the desired number of data streams.

The base station may select a user terminal to receive data according to a predetermined user selection algorithm, based on CQI and CDI of all the user terminals. The base station may perform ZFBF with respect to the selected user terminal based on the CDI, and transmit data to the selected user terminal. The base station may set a data transmission rate based on CDI fed back from each of the user terminals.

Where multiple receiving antennas exist, there may be a need to combine data received by the receiving antennas and thereby reduce a quantization error of CDI. Hereinafter, an algorithm used to reduce the quantization error will be described.

Where a single receiving antenna is installed in each of the user terminals, each of the user terminals may select, as a selection codebook vector, a nearest vector to the direction of the actual channel vector from quantized codebook vectors. Each of the user terminals may select from the codebook vectors a vector that has the smallest angle with respect to the actual channel vector.

Where at least two receiving antennas are installed, it is possible to perform linear combination of multiplying a particular coefficient by each of channel vectors corresponding to each of receiving antennas and adding up the result of the multiplication. Due to the linear combination, it is possible to reduce the quantization error.

For example, where three transmitting antennas are installed and a channel vector corresponding to a first receiving antenna of a particular user terminal is $h_1=[0.1, 0.9, 0]^T$ and a channel vector corresponding to a second receiving antenna of the user terminal is $h_2=[0.1, -0.9, 0]^T$, the user terminal may perform receive beamforming. An effective channel vector of the user terminal may be represented as $h_{eff}=b_1h_1+b_2h_2$. Here, $b_1$ and $b_2$ are weights used for receive beamforming.

Where $b_1$ and $b_2$ have random values, the effective channel vector $h_{eff}$ may be any one vector among a large number of vectors that exist in the space spanned by $h_1$ and $h_2$. The effective channel vector may be determined by comparing angles between the large number of vectors and the codebook vectors. Compared to a user terminal installed with a single receiving antenna, the user terminal with the multiple receiving antennas for performing receive beamforming may compare the vectors with the pre-stored codebook vectors to thereby reduce the quantization error.

Figure 2:
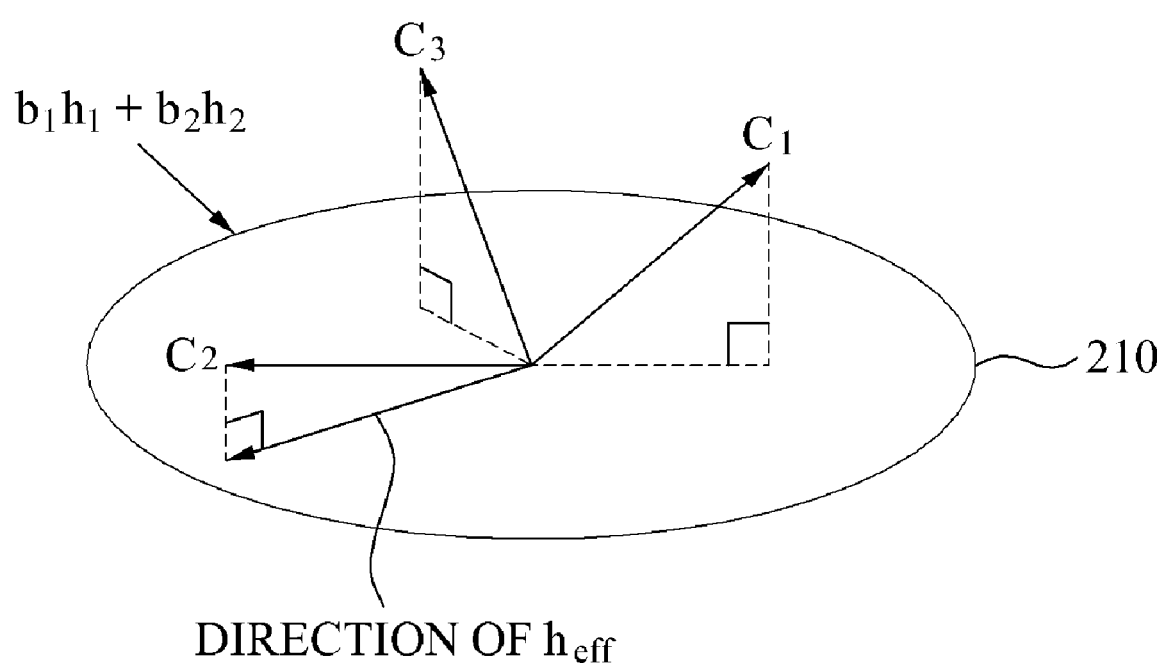
FIG. 2 illustrates an example of subspaces spanned by codebook vectors and channel vectors according to an exemplary embodiment.

FIG. 2 illustrates an example of subspaces spanned by codebook vectors and channel vectors.

Figure 3:
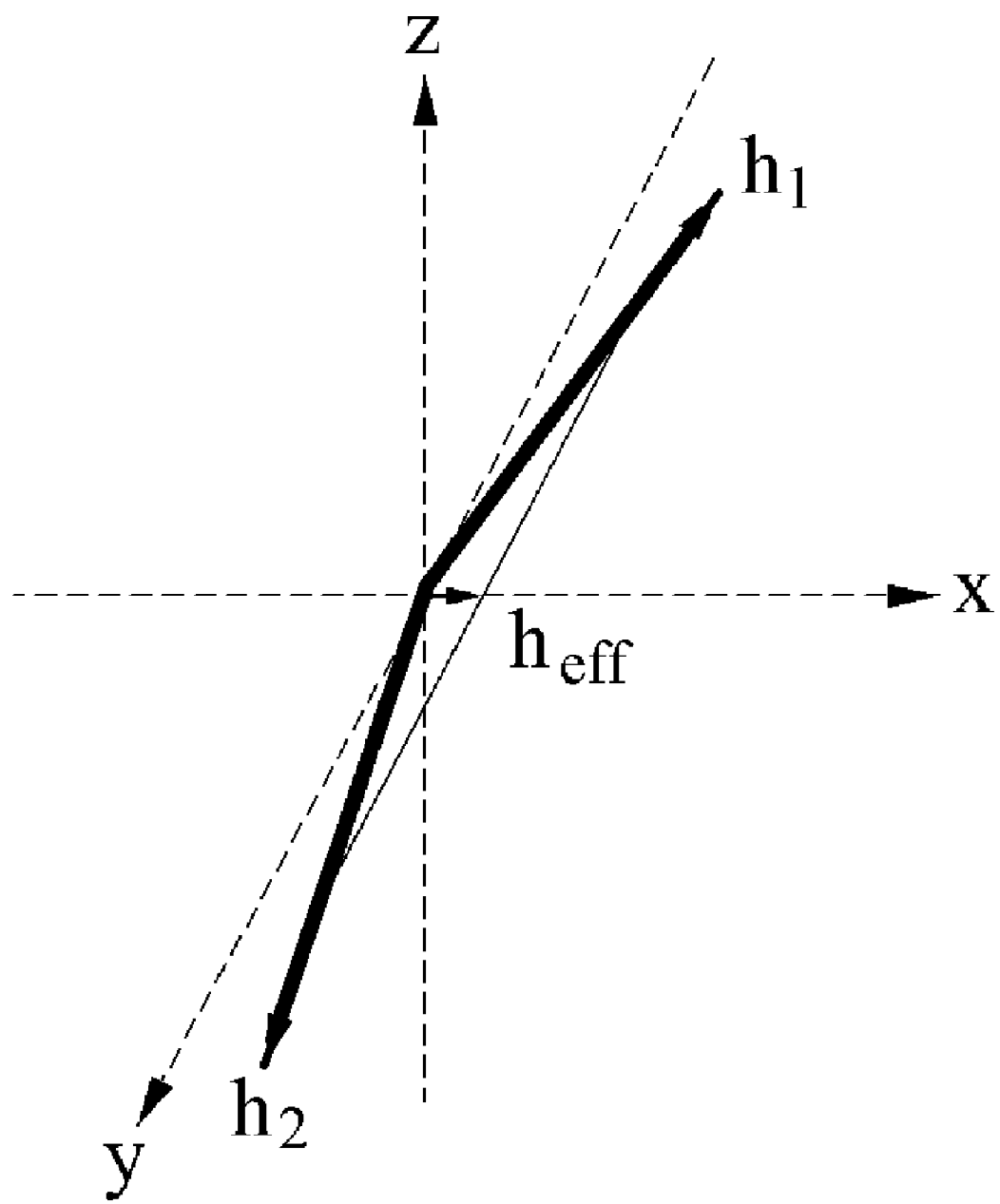
FIG. 3 illustrates an example of channel vectors and an effective channel vector according to an exemplary embodiment.

FIG. 3 illustrates an example of channel vectors and an effective channel vector.

Figure 4:
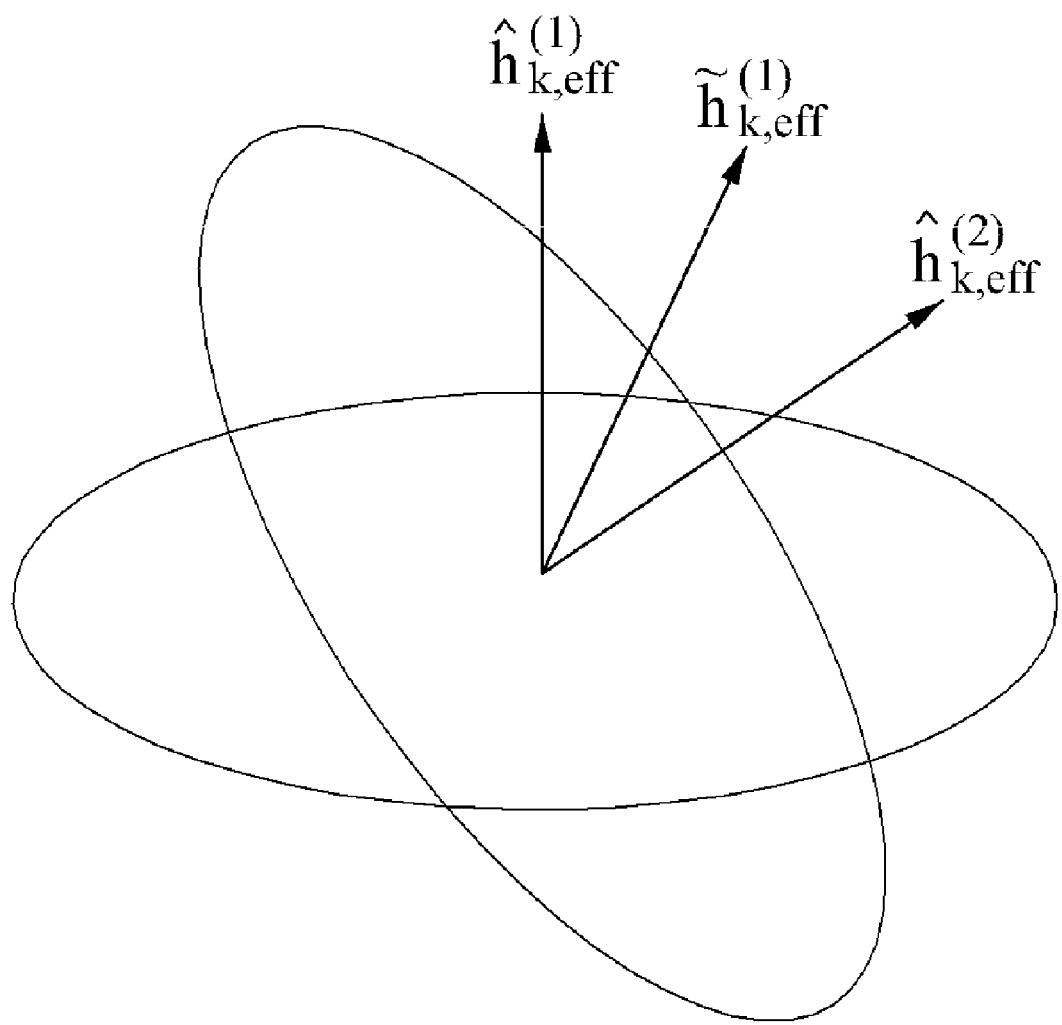
FIG. 4 illustrates an example of effective channel vectors where there are two data streams according to an exemplary embodiment.

FIG. 4 illustrates an example of effective channel vectors where there are two data streams.

Figure 5:
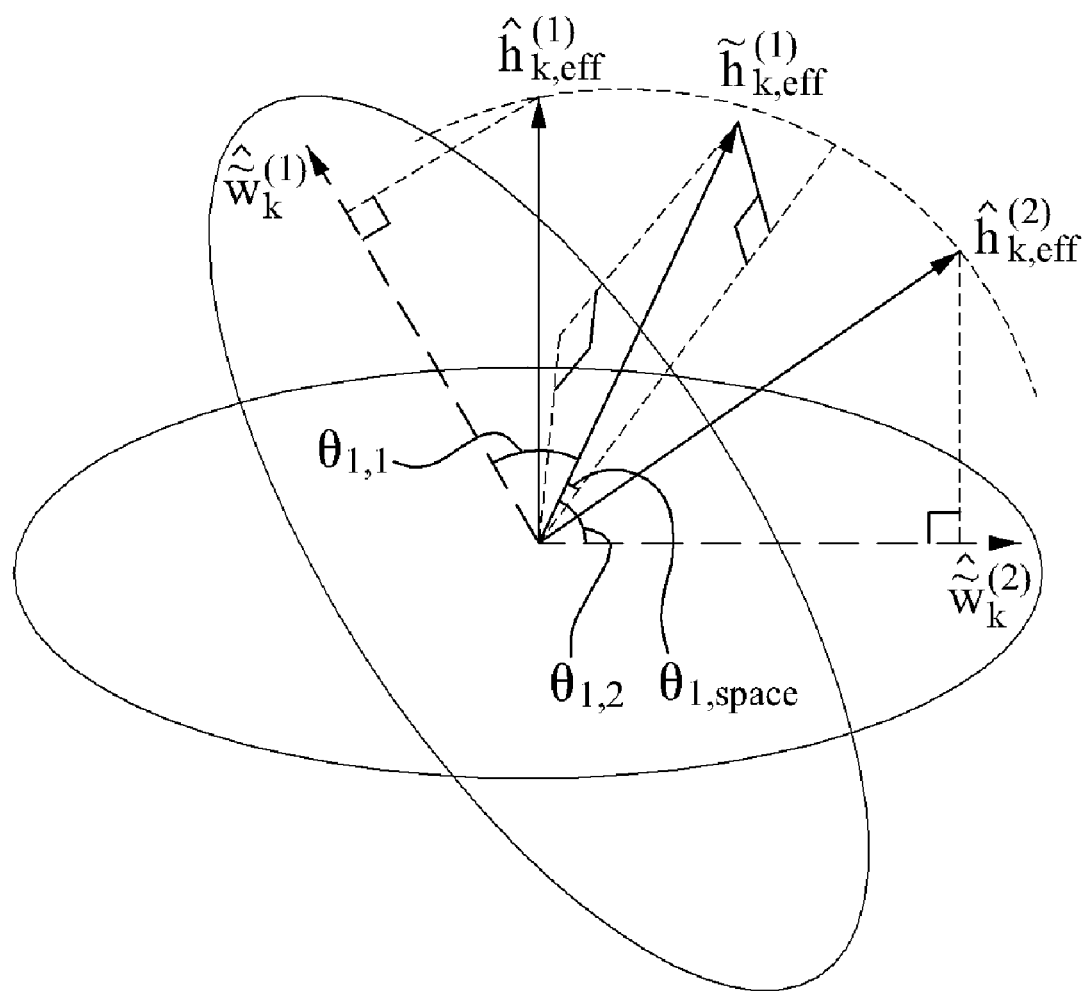
FIG. 5 illustrates an example of effective channel vectors and weight vectors according to an exemplary embodiment.

FIG. 5 illustrates an example of effective channel vectors and weight vectors.

Referring to FIG. 2, codebook vectors $C_1$, $C_2$, and $C_3$ with the magnitude of 1 exist. A circle 210 is a space spanned by channel vectors $h_1$ and $h_2$.

An angle between the codebook vectors and the space spanned by the channel vectors $h_1$ and $h_2$ may be calculated based on the magnitude of vectors that are generated by projecting the codebook vectors into the space spanned by the channel vectors $h_1$ and $h_2$. Specifically, as the angle between the codebook vectors and the space spanned by the channel vectors $h_1$ and $h_2$ increases, the magnitude of vectors generated by projecting the codebook vectors into the space spanned by the channel vectors $h_1$ and $h_2$ may be reduced.

By selecting, as the quantized effective channel vector, a codebook vector corresponding to the vector with the largest magnitude among vectors generated by projecting the codebook vectors into the space spanned by the channel vectors $h_1$ and $h_2$, it is possible to reduce the quantization error. Where the direction of the effective channel vector $h_{eff}$ is determined through the above process, the receive weight vector used for receive beamforming may be calculated according to $b=[b_1, b_2]$.

However, when calculating the effective channel vector $h_{eff}$ based on only the direction or the quantization error, it may cause a problem. The channel vectors $h_1$ and $h_2$ may be unchangeable vectors, whereas the effective channel vector $h_{eff}$ may be a changeable vector that may be generated by performing random linear combination with respect to the channel vectors $h_1$ and $h_2$. Also, the magnitude and the direction of the effective channel vector $h_{eff}$ may be selected as the optimized value. When focusing on only the direction of the effective channel vector $h_{eff}$, it may be ineffective.

Where the direction of $b_1h_1+b_2h_2$ is determined according to a normalization condition of $|b_1|^2+|b_2|^2=1$, there may be a problem in that the magnitude of the effective channel vector $h_{eff}$ may be automatically determined. In this case, the normalization condition may be required to maintain the power of Gaussian noise at the same level before and after the user terminal performs receive beamforming.

Where the effective channel vector $h_{eff}$ is determined to reduce only the quantization error, the quantization error may be minimized but the magnitude of $h_{eff}$ may be reduced. For example, where $h_1=[0.1, 0.9, 0]^T$ and where $h_2=[0.1, -0.9, 0]^T$, it is assumed that the direction of $h_{eff}$ calculated based on only the quantization error is $[1, 0, 0]^T$. $b_1=b_2\cong 0.7$ may be calculated based on $h_{eff}=b_1h_1+b_2h_2$ and $|b_1|^2+|b_2|^2=1$. Since the effective channel vector $h_{eff}$ may be calculated according to $h_{eff}\cong[0.14, 0, 0]^T$, it may be known that the magnitude of $h_{eff}$ is very small. FIG. 3 shows that the magnitude of $h_{eff}$ is determined as very small.

Although the quantization error slightly increases, where $h_{eff}$ is determined to have the direction of $h_1$, it may be seen that $h_{eff}=h_1$ and the magnitude of $h_{eff}$ significantly increases. Specifically, in a communication system according to a ZFBF transmission scheme where wireless resources that may be used to feed back channel information is limited, a signal-to-interference and noise ratio (SINR) measured in the user terminal may be a function of the quantization error and a function of the magnitude of the effective channel vector. Accordingly, there may be a need to increase the SINR based on the quantization error and the magnitude of the effective channel vector.

Prior to a more specific description, parameters or symbols used herein may be defined as follows:

(1) $h_k^{(i)}$: may be an M×1 channel vector corresponding to an $i^{th}$ receiving antenna of a $k^{th}$ user terminal. A $j^{th}$ component of $h_k^{(i)}$ may be a coefficient of a channel formed between a $j^{th}$ transmitting antenna of the base station and the $i^{th}$ receiving antenna of the $k^{th}$ user terminal.

(2) $H_k$: may be an M×N channel matrix corresponding to the $k^{th}$ user terminal. $H_k=[h_k^{(1)} \ h_k^{(2)} \ldots h_k^{(N)}]$.

(3) $c_i$: may be an $i^{th}$ (M×1) codebook vector among codebook vectors included in a codebook. The codebook vectors may be quantized as B bits and i may be an integer from 1 to $2^B$. The magnitude of $c_i$ may be normalized according to $\|c_i\|=1$ where $\|c_i\|$ is an Euclidian norm of $c_i$.

(4) $b_k^{(y)}$: may be an $r^{th}$ (N×1) receive weight vector that is used for receive beamforming of the $k^{th}$ user terminal. $b_k^{(r)} = [b_k^{(r,1)}, b_k^{(r,2)}, \ldots, b_k^{(r,N)}]^T$. Here, $\|b_k^{(y)}\|$1 and r is an index of each of independent data streams received by the user terminals. Where the number of data streams with respect to the $k^{th}$ user terminal is $R_k$, r may be an integer from 1 to $R_k$, and $R_k$ may be an integer from 1 to min(M, N).

(5) $h_{k,eff}^{(y)}$: may be an $r^{th}$ (M×1) effective channel vector of the $k^{th}$ user terminal after performing receive beamforming. $h_{k,eff}^{(y)} = b_k^{(y,1)} h_k^{(1)} + b_k^{(r,2)} h_k^{(2)} + \ldots + b_k^{(y,N)} h_k^{(N)}$ and $h_{k,eff}^{(y)} = H_k b_k^{(y)}$.

(6) $\bar{h}_{k,eff}^{(y)}$: $\tilde{h}_{k,eff}^{(r)} = h_{k,eff}^{(r)} / \|h_{k,eff}^{(r)}\|$ and $\|\tilde{h}_{k,eff}^{(r)}\| = 1$.

(7) $\tilde{w}_k^{(y)}$: may be an (M×1) ZFBF vector corresponding to an $r^{th}$ data stream of the $k^{th}$ user terminal. $\|\tilde{w}_k^{(y)}\| = 1$.

(8) $\tilde{w}_{\bar{k}}^{(y)}$: may be an M×1 transmitting ZFBF vector for an $r^{th}$ data stream corresponding to another user terminal excluding the $k^{th}$ user terminal. Here, r may be an integer from $R_k + 1$ to M, and $\|\tilde{w}_{\bar{k}}^{(y)}\| = 1$.

(9) space($v_1, v_2, \ldots, v_n$): may be an n-dimensional subspace that may be spanned by vectors $v_1, v_2, \ldots, v_n$. space($v_1, v_2, \ldots, v_n$) may be a subspace that may be expressed as $a_1 v_1 + a_2 v_2 + \ldots + a_n v_n$ with respect to a random constant $a_1, a_2, \ldots, a_n$.

A signal received by the $i^{th}$ receiving antenna of the $k^{th}$ user terminal may be represented by the following Equation 1:

$$y_k^{(i)} = (h_k^{(i)})^T x + n_k^{(i)}, \; i = 1, 2, \ldots, N \quad (1),$$

where x is an M×1 transmission signal vector, $n_k^{(i)}$ is complex Gaussian noise with zero mean and a variance of $\sigma^2$.

With respect to signals received by all the receiving antennas, a signal received by the $k^{th}$ user terminal after performing receive beamforming using the receive weight vector corresponding to the $r^{th}$ data stream may be represented by the following Equation 2:

$$\begin{aligned} y_{k,eff}^{(r)} &= b_k^{(r,1)} y_k^{(1)} + b_k^{(r,2)} y_k^{(2)} + \ldots + b_k^{(r,N)} y_k^{(N)} \\ &= \left( \sum_{i=1}^{N} b_k^{(r,i)} h_k^{(i)} \right)^T x + \sum_{i=1}^{N} b_k^{(r,i)} n_k^{(i)} \\ &= (h_{k,eff}^{(r)})^T x + \sum_{i=1}^{N} b_k^{(r,i)} n_k^{(i)}, \; r = 1, 2, \ldots, R_k. \end{aligned} \quad (2)$$

In order to adjust the variance of the complex Gaussian noise before performing receive beamforming to be the same as the variance of the complex Gaussian noise after performing receive beamforming, there may be a need for the normalization condition such as $|b_k^{(y,1)}|^2 + |b_k^{(y,2)}|^2 + \ldots + |b_k^{(y,N)}|^2 = 1$.

In the above Equation 2, it is assumed that $h_{k,eff}^{(r)}$ ($r = 1, 2, \ldots, R_k$) is the effective channel vector corresponding to the $r^{th}$ data stream and $\hat{h}_{k,eff}^{(y)}$ is a quantized vector corresponding to $h_{k,eff}^{(r)}$. In this case, $\|\hat{h}_{k,eff}^{(r)}\| = 1$ and $\hat{h}_{k,eff}^{(y)}$ may be determined as any one vector from codebook vectors $c_i$ ($i = 1, 2, \ldots, 2^B$).

Also, it is assumed that the base station transmitted M data streams using transmit beamforming weight vectors $\bar{w}_k^{(r)}$ ($r = 1, 2, 3, \ldots, R_k$) and $\bar{w}_{\bar{k}}^{(r)}$ ($r = R_k + 1, R_k + 2, \ldots, M$), and distributed the total transmission power P to each of the data streams. When accurately expressing the SINR of the $r^{th}$ ($r = 1, 2, \ldots, R_k$) data stream received by the $k^{th}$ user terminal, it may be represented by the following Equation 3:

$$SINR_k^{(r)} = \frac{(P/M) |(h_{k,eff}^{(r)})^T \bar{w}_k^{(r)}|^2}{\sigma^2 + (P/M) \left( \sum_{j=1, j \neq r}^{R_k} |(h_{k,eff}^{(r)})^T \bar{w}_k^{(j)}|^2 + \sum_{j=R_k+1}^{M} |(h_{k,eff}^{(r)})^T \bar{w}_{\bar{k}}^{(j)}|^2 \right)}. \quad (3)$$

In the above Equation 3, a denominator may be expressed as the addition of noise power and interference power. A first term of two terms corresponding to the interference power may be the power by another data stream excluding the $r^{th}$ data stream from the plurality of data streams received by the $k^{th}$ user terminal. A second term of the two terms may be the power by the data streams for other user terminals excluding the $k^{th}$ user terminal.

It is assumed that $h_{k,eff}^{(r)}$ and $\hat{h}_{k,eff}^{(y)}$ ($r = 1, 2, \ldots, R_k$) are determined according to a particular scheme. Since the $k^{th}$ user terminal may not detect the channel state of the other user terminals, the $k^{th}$ user terminal may not accurately identify the transmit beamforming weight vector. Accordingly, the $k^{th}$ user terminal may not accurately calculate the SINR according to the above Equation 3. However, the $k^{th}$ user terminal may approximately estimate the SINR, which will be described later.

It is assumed that the number of data streams $R_k$ is two. The SINR of a first data stream received by the $k^{th}$ user terminal may be represented by the following Equation 4:

$$\begin{aligned} SINR_k^{(1)} &= \frac{(P/M) |(h_{k,eff}^{(1)})^T \bar{w}_k^{(1)}|^2}{\sigma^2 + (P/M) \left( |(h_{k,eff}^{(1)})^T \bar{w}_k^{(2)}|^2 + \sum_{j=3}^{M} |(h_{k,eff}^{(1)})^T \bar{w}_{\bar{k}}^{j}|^2 \right)} \\ &= \frac{(P/M) \|h_{k,eff}^{(1)}\|^2 |(\bar{h}_{k,eff}^{(1)})^T \bar{w}_k^{(1)}|^2}{\sigma^2 + (P/M) \|h_{k,eff}^{(1)}\|^2 \left( |(\bar{h}_{k,eff}^{(1)})^T \bar{w}_k^{(2)}|^2 + \sum_{j=3}^{M} |(\bar{h}_{k,eff}^{(1)})^T \bar{w}_{\bar{k}}^{j}|^2 \right)}. \end{aligned} \quad (4)$$

Referring to FIG. 4 and the above Equation 4, the transmit beamforming weight vectors $\tilde{w}_k^{(1)}$ and $\tilde{w}_k^{(2)}$ may exist in subspaces that are orthogonal to $\hat{h}_{k,eff}^{(1)}$ and $\hat{h}_{k,eff}^{(2)}$. In FIG. 4, the number of transmitting antennas M is three and the subspace is two-dimensional. However, depending on embodiments, where the number of transmitting antennas M is four, the subspace may be three-dimensional.

Where it is assumed that the base station may select user terminals from a large number of user terminals to make the effective channel vectors of the user terminals be nearly orthogonal to each other, the transmit beamforming weight vector $\tilde{w}_k^{(1)}$ may be approximated to a particular value. Where it is assumed that an effective channel vector of another user terminal, excluding the $k^{th}$ user terminal, is nearly orthogonal to $\hat{h}_{k,eff}^{(1)}$ and $\hat{h}_{k,eff}^{(2)}$, the effective channel vector of the other user terminal may be approximately orthogonal to space($\hat{h}_{k,eff}^{(1)}, \hat{h}_{k,eff}^{(2)}$).

Since $\tilde{w}_k^{(1)}$ should be orthogonal to the effective channel vector of the other user terminal, it may be determined $\tilde{w}_k^{(1)}$ approximately exists in space($\hat{h}_{k,eff}^{(1)}, \hat{h}_{k,eff}^{(2)}$). Also, since $\tilde{w}_k^{(1)}$ should be orthogonal to $\hat{h}_{k,eff}^{(2)}$, it may be seen that the direction of a vector that is orthogonal to $\hat{h}_{k,\mathit{eff}}^{(2)}$ among vectors existing in space($\hat{h}_{k,\mathit{eff}}^{(1)}$, $\hat{h}_{k,\mathit{eff}}^{(2)}$) is approximately in the direction of $\tilde{w}_k^{(1)}$.

Similarly, it may be seen that, among the vectors existing in space($\hat{h}_{k,\mathit{eff}}^{(1)}$, $\hat{h}_{k,\mathit{eff}}^{(2)}$), the direction of the vector orthogonal to $\hat{h}_{k,\mathit{eff}}^{(1)}$ is approximately in the direction of $\tilde{w}_k^{(2)}$. Accordingly, by applying a Gramm-Schmidt orthogonalization scheme based on $\tilde{w}_k^{(1)}$ and $\tilde{w}_k^{(2)}$ that are generated by approximating the transmit weight vectors, $\hat{\tilde{w}}_k^{(1)}$ and $\hat{\tilde{w}}_k^{(2)}$ may be represented by the following Equation 5 and Equation 6:

$$\hat{\tilde{w}}_k^{(1)} = \frac{\hat{h}_{k,\mathit{eff}}^{(1)} - \left[(\hat{h}_{k,\mathit{eff}}^{(2)})^H \hat{h}_{k,\mathit{eff}}^{(1)}\right]\hat{h}_{k,\mathit{eff}}^{(2)}}{\left\|\hat{h}_{k,\mathit{eff}}^{(1)} - \left[(\hat{h}_{k,\mathit{eff}}^{(2)})^H \hat{h}_{k,\mathit{eff}}^{(1)}\right]\hat{h}_{k,\mathit{eff}}^{(2)}\right\|}, \tag{5}$$

$$\hat{\tilde{w}}_k^{(2)} = \frac{\hat{h}_{k,\mathit{eff}}^{(2)} - \left[(\hat{h}_{k,\mathit{eff}}^{(1)})^H \hat{h}_{k,\mathit{eff}}^{(2)}\right]\hat{h}_{k,\mathit{eff}}^{(1)}}{\left\|\hat{h}_{k,\mathit{eff}}^{(2)} - \left[(\hat{h}_{k,\mathit{eff}}^{(1)})^H \hat{h}_{k,\mathit{eff}}^{(2)}\right]\hat{h}_{k,\mathit{eff}}^{(1)}\right\|}. \tag{6}$$

In the case of the second term of the denominator in the above Equation 4, it may be known that $\tilde{w}_{\overline{k}}^{(j)}$ (j=3, ..., M) should be orthogonal to $\hat{h}_{k,\mathit{eff}}^{(1)}$ and $\hat{h}_{k,\mathit{eff}}^{(2)}$. $\tilde{w}_{\overline{k}}^{(j)}$ may have an isotropic probability distribution that may not predict the directivity in an (M−2) dimensional subspace orthogonal to space($\hat{h}_{k,\mathit{eff}}^{(1)}$, $\hat{h}_{k,\mathit{eff}}^{(2)}$). In the isotropic probability distribution, the mean of $|(\tilde{h}_{k,\mathit{eff}}^{(1)})^T \tilde{w}_{\overline{k}}^{(j)}|^2$ may be represented by the following Equation 7:

$$E\left[\left|(\tilde{h}_{k,\mathit{eff}}^{(1)})^T \tilde{w}_{\overline{k}}^{(j)}\right|^2\right] = \left(1 - \sum_{j=1}^{2} |u_j^H \overline{h}_{k,\mathit{eff}}^{(1)}|^2\right) \cdot \frac{1}{M-2}, \tag{7}$$

where $u_1$ and $u_2$ are orthonormal basis vectors of space ($\hat{h}_{k,\mathit{eff}}^{(1)}$, $\hat{h}_{k,\mathit{eff}}^{(2)}$), $u_1$ and $u_2$ may be calculated according to the Gramm-Schmidt orthogonalization scheme, $\Sigma_{j=1}^{2} |u_j^H \overline{h}_{k,\mathit{eff}}^{(1)}|^2$ is the square of a projection value that is generated by projecting $\overline{h}_{k,\mathit{eff}}^{(1)}$ into space($\hat{h}_{k,\mathit{eff}}^{(1)}$, $\hat{h}_{k,\mathit{eff}}^{(2)}$), and $$1 - \sum_{j=1}^{2} |u_j^H \overline{h}_{k,\mathit{eff}}^{(1)}|^2$$

is the square of a projection value that is generated by projecting $\overline{h}_{k,\mathit{eff}}^{(1)}$ into $\tilde{w}_{\overline{k}}^{(j)}$.

As described above, based on $\hat{\tilde{w}}_k^{(1)}$ and $\hat{\tilde{w}}_k^{(2)}$ that are generated by approximating $\tilde{w}_k^{(1)}$ and $\tilde{w}_k^{(2)}$, and the mean of $|(\tilde{h}_{k,\mathit{eff}}^{(1)})^T \tilde{w}_{\overline{k}}^{(j)}|^2$, $SINR_k^{(1)}$ may be approximated as given by the following equation 8:

$$SINR_k^{(1)} \cong \frac{(P/M)\|h_{k,\mathit{eff}}^{(1)}\|^2 \left|(\overline{h}_{k,\mathit{eff}}^{(1)})^T \hat{\tilde{w}}_k^{(1)}\right|^2}{\sigma^2 + (P/M)\|h_{k,\mathit{eff}}^{(1)}\|^2 \left( \begin{array}{c} \left|(\overline{h}_{k,\mathit{eff}}^{(1)})^T \hat{\tilde{w}}_k^{(2)}\right|^2 + \\ 1 - \sum_{j=1}^{2} |u_j^H \overline{h}_{k,\mathit{eff}}^{(1)}|^2 \end{array} \right)}. \tag{8}$$

Referring to FIG. 5 and the above Equation 8, a dotted line that connect $\hat{h}_{k,\mathit{eff}}^{(1)}$ and $\hat{h}_{k,\mathit{eff}}^{(2)}$ may indicate space($\hat{h}_{k,\mathit{eff}}^{(1)}$, $\hat{h}_{k,\mathit{eff}}^{(2)}$). Based on angles indicated in FIG. 5, $SINR_k^{(1)}$ may be approximated as given by the following equation 9:

$$SINR_k^{(1)} \cong \frac{(P/M)\|h_{k,\mathit{eff}}^{(1)}\|^2 \cos^2\theta_{1,1}}{\sigma^2 + (P/M)\|h_{k,\mathit{eff}}^{(1)}\|^2 (\cos^2\theta_{1,2} + \sin^2\theta_{1,\mathit{space}})}. \tag{9}$$

Where $\theta=\angle(x_1,x_2)$ is an angle between vectors $x_1$ and $x_2$, the angles used in the above Equation 9 may be represented by the following Equation 10, Equation 11, and Equation 12:

$$\theta_{1,1}=\angle(\tilde{h}_{k,\mathit{eff}}^{(1)},\hat{\tilde{w}}_k^{(1)}) \tag{10},$$

$$\theta_{1,2}=\angle(\tilde{h}_{k,\mathit{eff}}^{(1)},\hat{\tilde{w}}_k^{(2)}) \tag{11},$$

$$\theta_{1,\mathit{space}}=\angle(\tilde{h}_{k,\mathit{eff}}^{(1)},\mathrm{space}(\hat{h}_{k,\mathit{eff}}^{(1)},\hat{h}_{k,\mathit{eff}}^{(2)})) \tag{12}.$$

According to the same scheme as described above, $SINR_k^{(2)}$ may be represented by the following Equation 13:

$$SINR_k^{(2)} \cong \frac{(P/M)\|h_{k,\mathit{eff}}^{(2)}\|^2 \left|(\overline{h}_{k,\mathit{eff}}^{(2)})^T \hat{\tilde{w}}_k^{(2)}\right|^2}{\sigma^2 + (P/M)\|h_{k,\mathit{eff}}^{(2)}\|^2 \left( \begin{array}{c} \left|(\overline{h}_{k,\mathit{eff}}^{(2)})^T \hat{\tilde{w}}_k^{(1)}\right|^2 + \\ 1 - \sum_{j=1}^{2} |u_j^H \overline{h}_{k,\mathit{eff}}^{(2)}|^2 \end{array} \right)}$$

$$= \frac{(P/M)\|h_{k,\mathit{eff}}^{(2)}\|^2 \cos^2\theta_{2,2}}{\sigma^2 + (P/M)\|h_{k,\mathit{eff}}^{(2)}\|^2 (\cos^2\theta_{2,1} + \sin^2\theta_{2,\mathit{space}})}. \tag{13}$$

Each of the user terminals may feed back, as CDI, the calculated $SINR_k^{(1)}$ and $SINR_k^{(2)}$ to the base station.

For example, where the number of data streams $R_k$ is three, $SINR_k^{(1)}$ may be approximated as given by the following Equation 14:

$$SINR_k^{(1)} \cong \frac{(P/M)\|h_{k,\mathit{eff}}^{(1)}\|^2 \left|(\overline{h}_{k,\mathit{eff}}^{(1)})^T \hat{\tilde{w}}_k^{(1)}\right|^2}{\sigma^2 + (P/M)\|h_{k,\mathit{eff}}^{(1)}\|^2 \left( \begin{array}{c} \left|(\overline{h}_{k,\mathit{eff}}^{(1)})^T \hat{\tilde{w}}_k^{(2)}\right|^2 + \\ \left|(\overline{h}_{k,\mathit{eff}}^{(1)})^T \hat{\tilde{w}}_k^{(3)}\right|^2 \\ 1 - \sum_{j=1}^{3} |u_j^H \overline{h}_{k,\mathit{eff}}^{(1)}|^2 \end{array} \right)}$$

$$= \frac{(P/M)\|h_{k,\mathit{eff}}^{(1)}\|^2 \cos^2\theta_{1,1}}{\sigma^2 + (P/M)\|h_{k,\mathit{eff}}^{(1)}\|^2 \left( \begin{array}{c} \cos^2\theta_{1,2} + \cos^2\theta_{1,3} + \\ \sin^2\theta_{1,\mathit{space}} \end{array} \right)}. \tag{14}$$

Parameters used in the above Equation 14 may be given as follows:

$$w_k^{(r)} = \frac{\hat{h}_{k,\mathit{eff}}^{(r)} - \left[(u_{r,1})^H \hat{h}_{k,\mathit{eff}}^{(r)}\right]u_{r,1} - \left[(u_{r,2})^H \hat{h}_{k,\mathit{eff}}^{(r)}\right]u_{r,2}}{\left\|\hat{h}_{k,\mathit{eff}}^{(r)} - \left[(u_{r,1})^H \hat{h}_{k,\mathit{eff}}^{(r)}\right]u_{r,1} - \left[(u_{r,2})^H \hat{h}_{k,\mathit{eff}}^{(r)}\right]u_{r,2}\right\|} \tag{1}$$

$$\theta_{1,j} = \angle(\overline{h}_{k,\mathit{eff}}^{(1)},\hat{\tilde{w}}_k^{(j)}) \tag{2}$$

$$\theta_{1,\mathit{space}} = \angle\left(\overline{h}_{k,\mathit{eff}}^{(1)},\mathrm{space}\left(\hat{h}_{k,\mathit{eff}}^{(1)},\hat{h}_{k,\mathit{eff}}^{(2)},\hat{h}_{k,\mathit{eff}}^{(3)}\right)\right) \tag{3}$$

Here, $\{u_{1,1}, u_{1,2}\}$, $\{u_{2,1}, u_{2,2}\}$, and $\{u_{3,1}, u_{3,2}\}$ may denote orthonormal basis vectors of space($\hat{h}_{k,\mathit{eff}}^{(2)}$, $\hat{h}_{k,\mathit{eff}}^{(3)}$), space ($\hat{h}_{k,eff}^{(1)}$, $\hat{h}_{k,eff}^{(3)}$), and space($\hat{h}_{k,eff}^{(1)}$, $\hat{h}_{k,eff}^{(2)}$) respectively, $u_1$, $u_2$, $u_3$ may denote orthonormal basis vectors of space($\hat{h}_{k,eff}^{(1)}$, $\hat{h}_{k,eff}^{(2)}$, $\hat{h}_{k,eff}^{(3)}$).

For example, where the number of data streams $R_k$ is R, $SINR_k^{(y)}$ (r=1, 2, ..., R) may be approximated as given by the following Equation 15:

$$SINR_k^{(r)} \equiv \frac{(P/M)\|h_{k,eff}^{(r)}\|^2 \left|(\bar{h}_{k,eff}^{(r)})^T \hat{\tilde{w}}_k^{(r)}\right|^2}{\sigma^2 + (P/M)\|h_{k,eff}^{(r)}\|^2 \left( \begin{array}{c} \left|(\bar{h}_{k,eff}^{(r)})^T \hat{\tilde{w}}_k^{(j)}\right|^2 + \\ 1 - \sum_{j=1}^{R} |u_j^H \bar{h}_{k,eff}^{(r)}|^2 \end{array} \right)}$$

$$= \frac{(P/M)\|h_{k,eff}^{(r)}\|^2 \cos^2\theta_{r,r}}{\sigma^2 + (P/M)\|h_{k,eff}^{(r)}\|^2 \left( \sum_{j=1, j\neq r}^{R} \cos^2\theta_{r,j} + \sin^2\theta_{r,space} \right)}$$

$$= CQI_k^{(r)}(R). \tag{15}$$

Parameters used in the above Equation 15 may be given as follows:

$$\tilde{w}_k^{(r)} = \frac{\hat{h}_{k,eff}^{(r)} - \sum_{j=1}^{R-1} \left[(u_{r,j})^H \hat{h}_{k,eff}^{(r)}\right] u_{r,j}}{\left\| \hat{h}_{k,eff}^{(r)} - \sum_{j=1}^{R-1} \left[(u_{r,j})^H \hat{h}_{k,eff}^{(r)}\right] u_{r,j} \right\|} \tag{1}$$

$$\theta_{r,j} = \angle(\bar{h}_{k,eff}^{(r)}, \hat{\tilde{w}}_k^{(j)}) \tag{2}$$

$$\theta_{r,space} = \angle(\bar{h}_{k,eff}^{(r)}, \text{space}(\hat{h}_{k,eff}^{(1)}, \hat{h}_{k,eff}^{(2)}, \ldots, \hat{h}_{k,eff}^{(R)})) \tag{3}$$

Here, $\{u_{r,j}|j=1, 2, \ldots, R-1\}$ may be orthonormal basis vectors that may be (R−1) dimensional subspaces that may be spanned by remaining vectors after excluding $\hat{h}_{k,eff}^{(y)}$ from $\hat{h}_{k,eff}^{(1)}$, $\hat{h}_{k,eff}^{(2)}$, ..., $\hat{h}_{k,eff}^{(R)}$. $\{u_r|r=1, 2, \ldots, R\}$ may be orthonormal basis vectors of space($\hat{h}_{k,eff}^{(1)}$, $\hat{h}_{k,eff}^{(2)}$, ..., $\hat{h}_{k,eff}^{(R)}$).

Where the number of data streams $R_k$ is R, the approximated $SINR_k^{(y)}$ may be represented $CQI_k^{(y)}(R)$ as and each of the user terminals may feed back $CQI_k^{(y)}(R)$ to the base station via a feedback channel.

Hereinafter, a process of calculating CDI will be described.

Where $R_k=R$, optimized CDI may be calculated according to the following Equation 16:

$$\left\{ \hat{h}_{k,eff}^{(y)}(R)^* \mid r=1, 2, \ldots, R \right\} = \underset{\hat{h}_{k,eff}^{(y)}}{\text{argmax}} \left( \max_{\{h_{k,eff}^{(y)}\}} \sum_{\gamma=1}^{R} \log_2(1 + CQI_k^{(y)}(R)) \right). \tag{16}$$

Where R codebook vectors are pre-stored, $\{h_{k,eff}^{(y)}|r=1, 2, \ldots, R\}$ maximizing $$\sum_{\gamma=1}^{R} \log_2(1 + CQI_k^{(r)}(R))$$

may be calculated.

$$\sum_{r=1}^{R} \log_2(1 + CQI_k^{(r)}(R))$$

may be the sum of data transmission rates.

Among a plurality of combinable $\{h_{k,eff}^{(y)}|r=1, 2, \ldots, R\}$, it is possible to compare all the maximum values of $$\sum_{\gamma=1}^{R} \log_2(1 + CQI_k^{(r)}(R)).$$

$\{h_{k,eff}^{(y)}|r=1, 2, \ldots, R\}$ maximizing $$\sum_{\gamma=1}^{R} \log_2(1 + CQI_k^{(\gamma)}(R))$$

may be determined as the optimal CDI.

Where the number of data streams $R_k$ is adjustable based on the channel state, the optimized may be calculated according to the following Equation 17:

$$R_k^* = \arg\max_{R=1,2,\ldots,\min(M,N)} \max_{\{\hat{h}_{k,eff}^{(\gamma)}\}} \left( \max_{\{h_{k,eff}^{(\gamma)}\}} \sum_{r=1}^{R} \log_2(1 + CQI_k^{(r)}(R)) \right). \tag{17}$$

$\{\hat{h}_{k,eff}^{(r)}(R_k^*)^*|r=1, 2, \ldots, R\}$ corresponding to the calculated $R_k^*$ may be calculated as quantized CDI. However, a large amount of calculations may be needed to directly calculate $\{\hat{h}_{k,eff}^{(r)}(R_k^*)^*|r=1, 2, \ldots, R\}$ according to the above Equation 17. When using schemes disclosed as below, it is possible to calculate $\{\hat{h}_{k,eff}^{(r)}|r=1, 2, \ldots, R\}$ with relative fewer calculations.

Hereinafter, the disclosed schemes will be conceptually described.

When the user terminals calculate a plurality of effective channel vectors, the user terminals may calculate a most optimized effective channel vector in a current step, instead of jointly calculating the effective channel vectors. For example, in the case of $R_k=3$ will be described. When the user terminal calculates a first effective channel vector, the number of data streams may be assumed to be one. Specifically, assuming that a second effective channel vector and a third effective channel vector do not exist, the most optimized effective channel vector that enables the improvement of the receive performance may be calculated. When the user terminal calculates the second effective channel vector, the user terminal may calculate the most optimized effective channel vector assuming that the first effective channel vector is determined and the third effective channel vector does not exist. When the first effective channel vector and the second effective channel vector are determined, the user terminal may calculate the third effective channel vector.

When calculating each effective channel vector, the user terminal may determine the direction of a current effective channel vector to be nearly orthogonal to the direction of the previously determined effective channel vector.

When calculating each effective channel vector, the user terminal may select, as the effective channel vector, any one from a plurality of candidate codebook vectors. Specifically, instead of selecting the effective channel vector from only a single candidate codebook vector based on only a quantization error, the user terminal may select, as the effective channel vector, any one of the plurality of candidate codebook vectors and thus it is possible to improve an SINR.

When $R_k=3$ and the user terminal calculates the first effective channel vector, the user terminal may select the plurality of candidate codebook vectors based on angles between the effective channel vector and the codebook vectors in order to reduce the interference amount and the quantization error. Specifically, the user terminal may select $L_1$ candidate codebook vectors in an order of a smallest quantization error. The user terminal may determine, as the first effective channel vector, any one of the $L_1$ candidate codebook vectors, based on SINR calculated with respect to the $L_1$ candidate codebook vectors.

When the user terminal calculates the second effective channel vector, the user terminal may select $L_2$ candidate codebook vectors for the second effective channel vector. The user terminal may select, from the codebook vectors, vectors that are nearly orthogonal to the direction of the determined first effective channel vector. The user terminal may determine, as the second effective channel vector, any one of $L_2$ candidate codebook vectors based on SINR calculated with respect to the $L_2$ candidate codebook vectors.

When the user terminal calculates the third effective vector channel, a process similar to the above-described process may be used.

The disclosed schemes may be performed as follows:

It is assumed that the number of data streams $R_k$ of the $k^{th}$ user terminal is R.

(1) In step 1, the user terminal may initialize the number of data streams to "1", that is, may initialize an index s to "1".

(2) In step 2, the user terminal may calculate the magnitude of the projected vector that is generated by projecting $c_i (i=1, 2, \ldots, 2^B)$ into space($h_k^{(1)}, h_k^{(2)}, \ldots, h_k^{(N)}$). Where the magnitude of the projected vector is $\|c_i^{proj}\|^2$, $\|c_i^{proj}\|^2$ may be represented by the following Equation 18:

$$\|c_i^{proj}\|^2 = \sum_{j=1}^{N} |v_j^H c_i|^2, \qquad (18)$$

where $v_1, v_2, \ldots, v_N$ are orthonormal basis vectors of space($h_k^{(1)}, h_k^{(2)}, \ldots, h_k^{(N)}$).

(3) In step 3, the user terminal may compare $\|c_i^{proj}\|^2$ and select $L_1$ candidate codebook vectors from the codebook vectors in an order of greatest magnitude. The index of a $j^{th}$ candidate codebook vector may be expressed as $<j>$. $L_1$ may be a parameter that has the range of $1 \leq L_1 \leq 2^B$ and may be adjustable.

(4) In step 4, with respect to $j=1, 2, \ldots, L_1$, the user terminal may calculate the projection value $c_{<j>}^{proj}$ according to the following Equation 19:

$$c_{<j>}^{proj} = (v_1^H c_{<j>}) v_1 + (v_2^H c_{<j>}) v_2 + \ldots + (v_N^H c_{<j>}) v_N \qquad (19).$$

(5) In step 5, with respect to $j=1, 2, \ldots, L_1$, the user terminal may calculate the receive weight vector $b_k^{(1)}$ that is used for receive beamforming and may calculate $h_{k,eff}^{(1)}$ based on the calculated $b_k^{(1)}$. When expressing the calculated $h_{k,eff}^{(1)}$ as $h_{k,j,eff}^{(1)}$, $h_{k,j,eff}^{(1)}$ may be represented by the following Equation 20:

$$h_{k,j,eff}^{(1)} = H_k b_k^{(1)} \qquad (20)$$
$$= H_k \frac{(H_k^H H_k)^{-1} H_k^H c_{<j>}^{proj}}{\|(H_k^H H_k)^{-1} H_k^H c_{<j>}^{proj}\|}.$$

(6) In step 6, with respect to $j=1, 2, \ldots, L_1$, the user terminal may calculate the index $j^*$ maximizing $CQI_k^{(1)}(1)$, and the index $j^*$ may be represented by the following Equation 21:

$$j^* = \arg \max CQI_k^{(1)}(1)$$
$$1 \leq j \leq L_1 \qquad (21).$$

Here, for the values of $\hat{h}_{k,eff}^{(1)}$ and $h_{k,eff}^{(1)}$ required to calculate $CQI_k^{(1)}(1)$ with respect to j, the user terminal may use $h_{k,j,eff}^{(1)}$ and $c_{<j>}$ that are calculated in step 5.

(7) In step 7, the user terminal may use the index $j^*$ calculated in step 6 to thereby determine the first effective channel vector $\hat{h}_{k,eff}^{(1)}$ as given by the following Equation 22:

$$\hat{h}_{k,eff}^{(1)} c_{<j^*>} \qquad (22).$$

The index of the effective channel vector may be fed back to the base station as CDI.

The user terminal may determine the first effective channel vector $h_{k,eff}^{(1)}$ corresponding to the first data stream and the receive weight vector corresponding to the first effective channel vector $h_{k,eff}^{(1)}$, using the values corresponding to $j^*$ determined in step 5.

(8) In step 8, the user terminal may increase the index s, that is, the number of data streams by one, as shown in $s \leftarrow s+1$.

Where $s > R$, the user terminal may terminate the algorithm. Conversely, where $s \leq R$, the user terminal may perform the following step.

(9) In step 9, the user terminal may select $L_s$ candidate codebook vectors from codebook vectors $\{c_i | i=1, 2, \ldots, 2^B\}$ depending on the orthogonality with respect to space($\hat{h}_{k,eff}^{(1)}, \hat{h}_{k,eff}^{(2)}, \ldots, \hat{h}_{k,eff}^{(s-1)}$) that is a subspace spanning $\{\hat{h}_{k,eff}^{(r)} | r=1, 2, \ldots, s-1\}$ that is determined in the previous step. The user terminal may indicate the index of the $j^{th}$ candidate codebook vector as $<j>$. $L_s$ may be a parameter that has the range of $1 \leq L_s \leq 2^B$ and be adjustable.

Where $z_1, z_2, \ldots, z_{s-1}$ are orthonormal basis vectors of space($\hat{h}_{k,eff}^{(1)}, \hat{h}_{k,eff}^{(2)}, \ldots, \hat{h}_{k,eff}^{(s-1)}$), the orthogonality may be determined based on the value of $$\sum_{j=1}^{s-1} |z_j^H c_i|^2.$$

For example, it may be determined that the orthogonality may increase as $$\sum_{j=1}^{s-1} |z_j^H c_i|^2$$

decreases.

(10) In step 10, with respect to $j=1, 2, \ldots, L_s$, the user terminal may calculate the projection value $c_{<j>}^{proj}$ that is projected into space($h_k^{(1)}, h_k^{(2)}, \ldots, h_k^{(N)}$) and is generated, according to the following Equation 23:

$$c_{<j>}^{proj} = (v_1^H c_{<j>}) v_1 + (v_2^H c_{<j>}) v_2 + \ldots + (v_N^H c_{<j>}) v_N \qquad (23).$$

The user terminal may use again the calculation results obtained in steps 1 and 4 to calculate the projection value $c_{<j>}^{proj}$.

(11) In step 11, with respect to j=1, 2, . . . , $L_s$, the user terminal may calculate the receive weight vector $b_k^{(s)}$ and calculate $h_{k,eff}^{(s)}$ based on the calculated $b_k^{(s)}$. The user terminal may calculate $h_{k,eff}^{(s)}$ according to the following Equation 24:

$$h_{k,j,eff}^{(s)} = H_k b_k^{(1)} \qquad (24)$$
$$= H_k \frac{(H_k^H H_k)^{-1} H_k^H c_{<j>}^{proj}}{\|(H_k^H H_k)^{-1} H_k^H c_{<j>}^{proj}\|}.$$

(12) In step 12, with respect to j=1, 2, . . . $L_s$, the user terminal may calculate the index j* according to the following Equation 25:

$$j^* = \arg\max_{1 \leq j \leq L_s} \sum_{r=1}^{s} \log_2(1 + CQI_k^{(r)}(s)). \qquad (25)$$

With respect to j, $h_{k,j,eff}^{(s)}$ and $c_{<j>}$ calculated in step 11 are respectively used for $h_{k,eff}^{(s)}$ and $\hat{h}_{k,eff}^{(s)}$ that are used to calculate $CQI_k^{(r)}(s)$.

(13) In step 13, the user terminal may use the index j* calculated in step 12 to determine an $s^{th}$ effective channel vector $\hat{h}_{k,eff}^{(s)}$ as given by the following Equation 26:

$$\hat{h}_{k,eff}^{(s)} = c_{<j^*>} \qquad (26).$$

The user terminal may determine the effective channel vector $h_{k,eff}^{(s)}$ corresponding to the $s^{th}$ data stream and the receive weight vector $b_k^{(s)}$ corresponding to $h_{k,eff}^{(s)}$ as a value corresponding to calculated in step 11.

(14) In step 14, the user terminal may perform step 8.

The exemplary scheme disclosed herein may be applicable even where the number of data streams is adjustable.

The number of data streams $R_k$ may be any one integer among integers from 1 to min (M, N) depending on the channel state. An exemplary embodiment may be applicable according to the above-described steps 1 through 14. Additional processes may be performed as follows:

In the case of increasing the index s that is the number of data streams, where the index s is greater than min(M, N), or where $$\sum_{r=1}^{s} \log_2(1 + CQI_k^{(r)}(s))$$

corresponding to the current index s is less than or equal to $$\sum_{r=1}^{s} \log_2(1 + CQI_k^{(r)}(s))$$

corresponding to the previous index s, the user terminal may terminate the algorithm. The previous index s may be the number of data streams corresponding to a corresponding user terminal.

Therefore, where the number of data streams is adjustable, the exemplary embodiment may be configured by modifying the above steps 6, 8, and 12 among the above-described steps 1 through 14.

(1) Modification of step 6:

With respect to j=1, 2, . . . , $L_1$, the user terminal may calculate j* to maximize $CQI_k^{(1)}(1)$ of the following Equation 27:

$$j^* = \arg\max_{1 \leq j \leq L_1} CQI_k^{(1)}(1). \qquad (27)$$

With respect to j, $h_{k,j,eff}^{(1)}$ and $c_{<j>}$ calculated in step 5 are used for $h_{k,eff}^{(1)}$ and $\hat{h}_{k,eff}^{(1)}$ required to calculate $CQI_k^{(1)}(1)$. The user terminal may store $\log_2(1+CQI_k^{(1)}(1))$ corresponding to j* as sum_rate(1).

(2) Modification of step 8:

The user terminal may increase the index s, that is, the number of data streams by one, as shown in s←s+1.

Where s>min(M, N), the user terminal may terminate the algorithm and set $R_k$ to min(M, N). Where s>2 and sum_rate (s−1)≦sum_rate(s−2), the user terminal may terminate the algorithm and set $R_k$ to s−2. Where the algorithm is terminated, the effective channel vector may be determined as $\{\hat{h}_{k,eff}^{(r)}|r=1, 2, \ldots, s\}$ when s=$R_k$. Conversely, where the algorithm is not terminated, the following step may be performed.

(3) Modification of step 12:

With respect to j=1, 2, . . . , $L_s$, the user terminal may calculate j* according to the following Equation 28:

$$j^* = \arg\max_{1 \leq j \leq L_1} \sum_{r=1}^{s} \log_2(1 + CQI_k^{(r)}(s)). \qquad (28)$$

With respect to j, the user terminal may use $h_{k,j,eff}^{(s)}$ and $c_{<j>}$ calculated in step 11 for the values of $h_{k,eff}^{(s)}$ and $\hat{h}_{k,eff}^{(s)}$ required to calculate $CQI_k^{(r)}(s)$. The user terminal may store $$\sum_{r=1}^{s} \log_2(1 + CQI_k^{(r)}(s))$$

corresponding to j* as sum_rate(s).

Figure 6:
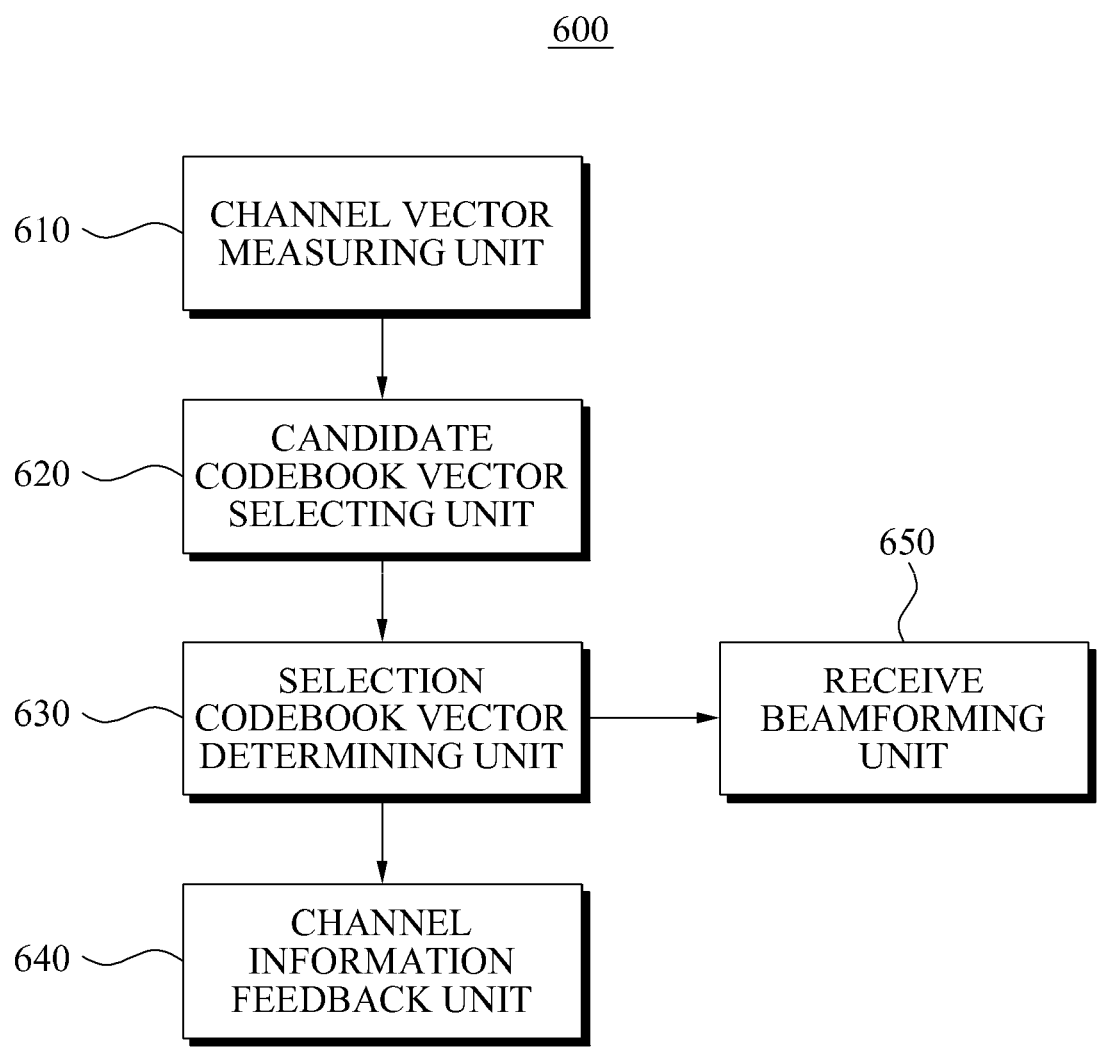
FIG. 6 is a block diagram of a receiver for feeding back channel information according to an exemplary embodiment.

FIG. 6 is a block diagram illustrating a receiver 600 for feeding back channel information according to an exemplary embodiment.

Referring to FIG. 6, the receiver 600 includes a channel vector measuring unit 610, a candidate codebook vector selecting unit 620, a selection codebook vector determining unit 630, a channel information feedback unit 640, and a receive beamforming unit 650.

The channel vector measuring unit 610 may measure channel vectors corresponding to a plurality of receiving antennas, respectively, that receive a plurality of data streams.

The candidate codebook vector selecting unit 620 may select at least two codebook vectors from codebook vectors included in a codebook, by considering a quantization error based on the channel vectors with respect to each of the data streams.

The candidate codebook vector selecting unit 620 may predict the quantization error based on an angle between a space spanned by the codebook vectors and a space spanned by the channel vectors and select the candidate codebook vectors based on the quantization error.

The candidate codebook vector selecting unit 620 may select the candidate codebook vectors in an order of a smallest quantization error among the codebook vectors.

The selection codebook vector determining unit 630 may determine selection codebook vectors corresponding to the plurality of data streams respectively from the candidate codebook vectors based on an SINR of each of the data streams that is calculated according to each of the candidate codebook vectors.

The selection codebook vector determining unit 630 may determine a selection codebook vector corresponding to each of the data streams from the candidate codebook vectors, so that the sum of data transmission rates may be maximized. The sum may be a function of the SINR of each of the data streams.

Where the plurality of data streams include a first data stream, the candidate codebook vector selecting unit 620 may select at least two candidate codebook vectors associated with the first data stream from the codebook vectors, based on the quantization error corresponding to the angle between the space spanned by the codebook vectors and the space spanned by the channel vectors. The selection codebook vector determining unit 630 may determine a first selection codebook vector corresponding to the first data stream from the first candidate codebook vectors, based on the SINR of the first data stream that is calculated according to the at least two first candidate codebook vectors.

Where the plurality of data streams further include a second data stream, the candidate codebook vector selecting unit 620 may select at least two second candidate codebook vectors associated with the second data stream from the codebook vectors, based on the orthogonality between the first selection codebook vector and the codebook vectors. The selection codebook vector determining unit 630 may determine a second selection codebook vector corresponding to the second data stream from the second candidate codebook vectors, based on the addition of the data rates depending on SINR of the first data stream and the SINR of the second data stream that is calculated based on the at least two second candidate codebook vectors.

Where the plurality of data streams further include a third data stream, the candidate codebook vector selecting unit 620 may select at least two third candidate codebook vectors associated with the third data stream from the codebook vectors, based on an angle between the codebook vectors and a space spanned by the first selection codebook vector and the second codebook vector. The selection codebook vector determining unit 630 may determine a third selection codebook vector corresponding to the third data stream from the third candidate codebook vectors, based on a sum of a data transmission rate that is a function of the SINR of the first data stream, the SINR of the second data stream, and the SINR of the third data stream that is calculated based on the at least two third candidate codebook vectors.

The channel information feedback unit 640 may feed back to a base station CDI and CQI corresponding to the selection codebook vector.

The receive beamforming unit 650 may perform receive beamforming using the determined selection codebook vector.

The methods described above including channel information feeding back method according to an exemplary embodiment may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter.

According to certain embodiments above, there is provided a receiver and method of feeding back channel information that selects a plurality of candidate codebook vectors based on a plurality of quantization errors and signal-to-interference and noise ratios (SINRs) and determines, as an effective channel vector, any one candidate codebook vector from the plurality of candidate codebook vectors so as to improve the receive performance of the receiver. There is also provide a receiver and method of feeding back channel information that determines effective channel vectors corresponding to a plurality of data streams according to a scheme so as to improve the receive performance of the receiver with relatively fewer calculations.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A receiver for feeding back channel information, comprising:
   a channel vector measuring unit to measure channel vectors corresponding to a plurality of receiving antennas, respectively, that receive a plurality of data streams;
   a candidate codebook vector selecting unit to select at least two candidate codebook vectors from codebook vectors included in a codebook, by considering a quantization error based on the channel vectors with respect to each of the data streams; and
   a selection codebook vector determining unit to determine selection codebook vectors corresponding to the plurality of data streams respectively from the at least two candidate codebook vectors, based on a signal-to-interference and noise ratio (SINR) of each of the data streams that is calculated according to each of the candidate codebook vectors;
   wherein the plurality of data streams comprises a first data stream,
   the candidate codebook vector selecting unit selects at least two first candidate codebook vectors associated with the first data stream from the codebook vectors, based on the quantization error corresponding to an angle between the codebook vectors and a space spanned by the channel vectors, and
   the selection codebook vector determining unit determines a first selection codebook vector corresponding to the first data stream from the first candidate codebook vectors, based on the SINR of the first data stream that is calculated according to the at least two first candidate codebook vectors.

2. The receiver as claimed in claim 1, wherein the plurality of data streams further comprises a second data stream,
   the candidate codebook vector selecting unit selects at least two second candidate codebook vectors associated with the second data stream from the codebook vectors, based on an orthogonality between the first selection codebook vectors and the codebook vectors, and the selection codebook vector determining unit determines a second selection codebook vector corresponding to the second data stream from the second candidate codebook vectors, based on a sum of data transmission rates that is a function of the SINR of the first data stream and the SINR of the second data stream that is calculated based on the at least two second candidate codebook vectors.

3. The receiver as claimed in claim 2, wherein the plurality of data streams further comprises a third data stream, the candidate codebook vector selecting unit selects at least two third candidate codebook vectors associated with the third data stream from the codebook vectors, based on an angle between the codebook vectors and a space spanned by the first selection codebook vector and the second selection codebook vector, and the selection codebook vector determining unit determines a third selection codebook vector corresponding to the third data stream from the third candidate codebook vectors, based on a sum of data transmission rates that is a function of the SINR of the first data stream, the SINR of the second data stream, and the SINR of the third data stream that is calculated based on the at least two third candidate codebook vectors.

4. The receiver as claimed in claim 1, wherein the selection codebook vector determining unit determines the selection codebook vectors corresponding to the plurality of data streams respectively from the candidate codebook vectors to maximize a sum of data transmission rates that is a function of the SINR of each of the data streams.

5. The receiver as claimed in claim 1, wherein the candidate codebook vector selecting unit selects the candidate codebook vectors from the codebook vectors in an order from a smallest quantization error.

6. The receiver as claimed in claim 1, wherein the candidate codebook vector selecting unit estimates the quantization error based on an angle between the codebook vectors and a space spanned by the channel vectors, and selects the candidate codebook vectors based on the estimated quantization error.

7. The receiver as claimed in claim 1, further comprising:
a receive beam forming unit to perform receive beam forming using the determined selection codebook vectors.

8. The receiver as claimed in claim 1, further comprising:
a channel information feedback unit to feed back to a base station channel direction information and channel quality information corresponding to the selection codebook vectors.

9. A receiver for feeding back channel information, comprising:

a channel vector measuring unit to measure channel vectors corresponding to a plurality of receiving antennas, respectively, that receive a data stream;

a candidate codebook vector selecting unit to select at least two candidate codebook vectors from codebook vectors included in a codebook, by considering a quantization error based on the channel vectors;

a selection codebook vector determining unit to determine a selection codebook vector corresponding to the data stream from the candidate codebook vectors, based on a signal-to-interference and noise ratio (SINR) that is calculated according to each of the candidate codebook vectors; and a receive beam forming unit to perform receive beam forming using the determined selection codebook vector;

wherein the candidate codebook vector selecting unit selects the at least two candidate codebook vectors associated with the data stream from the codebook vectors, based on the quantization error corresponding to an angle between the codebook vectors and a space spanned by the channel vectors, and the selection codebook vector determining unit determines the selection codebook vector corresponding to the data stream from the candidate codebook vectors, based on the SINR of the data stream that is calculated according to the at least two candidate codebook vectors.

10. The receiver as claimed in claim 9, further comprising:
a channel information feedback unit to feed back to a base station channel direction information and channel quality information corresponding to the selection codebook vector.

11. The receiver as claimed in claim 9, wherein the receive beam forming unit performs receive beam forming using receive weight vectors that are calculated based on the selection codebook vector.

12. A method of feeding back channel information, comprising:

measuring channel vectors corresponding to a plurality of receiving antennas, respectively, that receive a plurality of data streams;

selecting at least two candidate codebook vectors from codebook vectors included in a codebook, by considering a quantization error based on the channel vectors with respect to each of the data streams; and determining selection codebook vectors corresponding to the plurality of data streams respectively from the candidate codebook vectors, based on a signal-to-interference and noise ratio (SINR) of each of the data streams that is calculated according to each of the candidate codebook vectors;

wherein the plurality of data streams comprises a first data stream, the selecting comprises selecting at least two first candidate codebook vectors associated with the first data stream from the codebook vectors, based on the quantization error corresponding to an angle between the codebook vectors and a space spanned by the channel vectors, and the determining comprises determining a first selection codebook vector corresponding to the first data stream from the first candidate codebook vectors, based on the SINR of the first data stream that is calculated according to the at least two first candidate codebook vectors.

13. The method as claimed in claim 12, further comprising:
performing receive beam forming based on the determined selection codebook vectors.

14. The method as claimed in claim 12, further comprising:
feeding back to a base station channel direction information and channel quality information corresponding to the selection codebook vectors.

15. The method as claimed in claim 12, wherein the selecting of the at least two candidate codebook vectors comprises estimating the quantization error based on an angle between the codebook vectors and a space spanned by the channel vectors, and selecting the candidate codebook vectors based on the estimated quantization error.

16. The method as claimed in claim 12, wherein the determining of the selection codebook vectors comprises determining the selection codebook vectors corresponding to the plurality of data streams respectively from the candidate codebook vectors to maximize a sum of data transmission rates that is a function of the SINR of each of the data streams.

17. A method of generating quality information of a terminal receiving a plurality of data streams, comprising:
- measuring channel vectors corresponding to a plurality of receiving antennas, respectively, that receive a plurality of data streams;
- selecting at least two candidate codebook vectors from codebook vectors included in a codebook, by considering a quantization error based on the channel vectors with respect to each of the data streams;
- determining selection codebook vectors corresponding to the plurality of data streams respectively from the candidate codebook vectors, based on a signal-to-interference and noise ratio (SINR) of each of the data streams that is calculated according to each of the candidate codebook Vectors;
- calculating effective channel vectors corresponding to the plurality of data streams respectively based on the selection codebook vectors;
- calculating a signal-to-interference and noise ratio (S1NR) of each of the effective channel vectors based on an interference power caused by at least one adjacent terminal of the terminal and another interference power caused by remaining data streams after excluding a target data stream from the plurality of data streams; and
- feeding back to a base station channel quality information associated with each of the effective channel vectors, wherein the channel quality information includes the corresponding SINR that is quantized;
- wherein the plurality of data streams comprises a first data stream,
- the selecting comprises selecting at least two first candidate codebook vectors associated with the first data stream from the codebook vectors, based on the quantization error corresponding to an angle between the codebook vectors and a space spanned by the channel vectors, and
- the determining comprises determining a first selection codebook vector corresponding to the first data stream from the first candidate codebook vectors, based on the SINR of the first data stream that is calculated according to the at least two first candidate codebook vectors.

18. The method as claimed in claim 17, wherein the calculating of the SINR comprises:
- estimating transmit weight vectors corresponding to the plurality of data streams respectively, based on the effective channel vectors;
- estimating the interference power caused by the at least one adjacent terminal of the terminal, based on the effective channel vectors and the estimated transmit weight vectors; and
- estimating the interference power caused by the remaining data streams, based on the effective channel vectors.

19. A non-transitory computer-readable storage medium storing a program for implementing a method of feed back channel information, the method comprising
- measuring channel vectors corresponding to a plurality of receiving antennas, respectively, that receive a plurality of data streams;
- selecting at least two candidate codebook vectors from codebook vectors included in a codebook, by considering a quantization error based on the channel vectors with respect to each of the data streams; and
- determining selection codebook vectors corresponding to the plurality of data streams respectively from the candidate codebook vectors, based on a signal-to-interference and noise ratio (SINR) of each of the data streams that is calculated according to each of the candidate codebook vectors;
- wherein the plurality of data streams comprises a first data stream,
- the selecting comprises selecting at least two first candidate codebook vectors associated with the first data stream from the codebook vectors, based on the quantization error corresponding to an angle between the codebook vectors and a space spanned by the channel vectors, and
- the determining comprises determining a first selection codebook vector corresponding to the first data stream from the first candidate codebook vectors, based on the SINR of the first data stream that is calculated according to the at least two first candidate codebook vectors.

* * * * *